United States Patent [19]

Liptak, Jr. et al.

[11] Patent Number: 4,686,514

[45] Date of Patent: Aug. 11, 1987

[54] ALARM SYSTEM FOR COMPUTERS AND THE LIKE

[75] Inventors: Frank J. Liptak, Jr., Webster; Arthur J. North, Rochester, both of N.Y.

[73] Assignee: Integrated Technology Work, Inc., Pittsford, N.Y.

[21] Appl. No.: 865,626

[22] Filed: May 22, 1986

[51] Int. Cl.$^4$ ............................................. G08B 13/14
[52] U.S. Cl. ................................... 340/571; 340/572;
340/568; 340/653; 340/310 CP; 340/693
[58] Field of Search ............... 340/571, 572, 568, 653,
340/652, 586, 546, 687, 689, 693, 310 CP;
116/77

[56]  . References Cited
U.S. PATENT DOCUMENTS

| 3,710,371 | 1/1973 | Whalen et al. | 340/571 |
| 3,836,901 | 9/1974 | Matto et al. | 340/571 |
| 4,284,983 | 8/1981 | Lent | 340/571 |

*Primary Examiner*—Donnie L. Crosland
*Attorney, Agent, or Firm*—Shlesinger Fitzsimmons Shlesinger

[57] ABSTRACT

Several modular circuits are releasably connected to one another and with the plug which supplies AC power to a computer or the like. A first circuit rectifies the AC voltage and applies a DC voltage to one side of a motion sensing circuit, the opposite side of which is connected to a third circuit containing a portable, DC power supply. The third circuit include an electrically operated alarm, and an electronic valve, which normally maintains the alarm deenergized. The motion sensing circuit contains a capacitor in parallel with a mercury switch which, when subjected to sudden movement, closes and switches the electronic valve to a conducting mode, thereby energizing the alarm, provided the equipment has been unplugged so that the AC power has been removed from the first circuit. The capacitor delays the deenergization of the alarm after the mercury switch recloses; and the DC voltage provided by the AC power supply prolongs the life of the portable DC power supply (battery).

14 Claims, 2 Drawing Figures

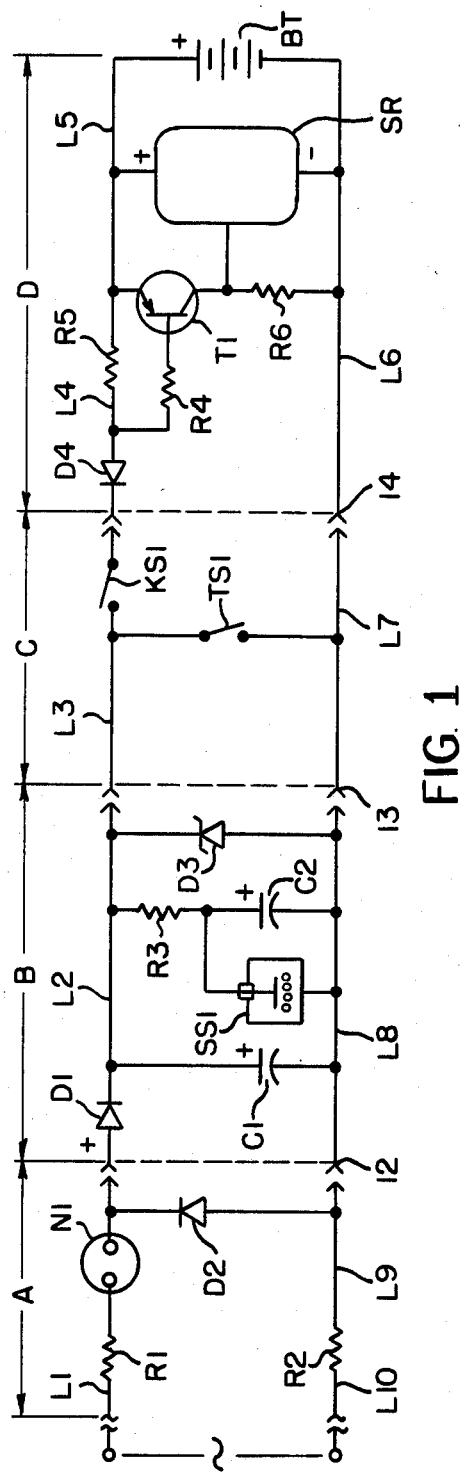
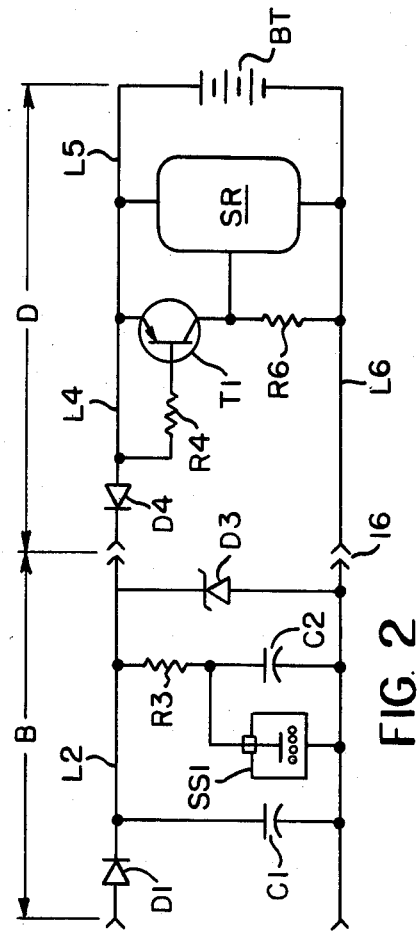
FIG. 1
FIG. 2

ALARM SYSTEM FOR COMPUTERS AND THE LIKE

BACKGROUND OF THE INVENTION

This invention relates to an alarm system designed to prevent the theft of electrical or electronic devices such as computers, printers, olscilloscopes and similar devices which can be rather expensive to replace. More particularly this invention relates to a motion sensitive alarm device which, when incorporated in a computer, or like device; is adopted to emit an audible alarm or signal when the device is wrongfully moved.

There are currently available in the marketplace a number of devices which are designed to deter the theft of rather expensive electronic equipment, such as computers and the like. Some such devices are designed physically to secure the equipment against removal, while others, which may or may not be employed in combination with the aforementioned devices, are designed to produce a warning signal if an effort is made to effect unauthorized removal of the equipment. A variety of such signaling devices are disclosed in U.S. Pat. Nos. 3,484,775; 3,710,371; 3,766,540; 3,836,901; 4,284,983 and 4,327,360.

Of particular interest are the U.S. Pat. Nos. 3,710,371 and 3,836,901 and 4,284,983, each of which suggests using some means to detect whether or not the protected device has been wrongfully moved, and if so, to emit a warning signal. The first of these three patents suggests using a mercury switch to sense unauthorized movement of the associated device and to trigger an alarm. The disadvantage is that once the alarm is energized it is latched in its operative mode until shut off by a special key. The devices disclosed by the latter two Patents have the additional advantage that they function to produce an alarm only upon disconnecting the associated equipment from a power source, and upon wrongful movement of the equipment.

Such prior switch devices however, have proved to be unsatisfactory in many respects. In the case of the device disclosed by the U.S. Pat. No. 3,710,371, for example, any innocent movement of the associated equipment causes a false alarm to be emitted. In the case of the U.S. Pat. Nos. 3,836,901 and 4,284,983, each alarm is latched in an operating mode once it is energized. Also, the device of U.S. Pat. No. 4,284,983 requires a special oscillator circuit to provide a pulsating signal to an alarm, and a battery recharging circuit and a special monitoring circuit are necessary for determining whether or not the power is being supplied to the recharging circuit for the battery.

It is an object of this invention, therefore, to provide an improved computer alarm system of the type described which is substantially more compact, reliable and inexpensive to manufacture than prior such systems.

Another object of this invention is to provide an improved, motion sensitive computer alarm system of the audible type, which will automatically shut off at a predetermined time after unauthorized movement of the computer has ceased.

It is a further object of this invention to provide an improved system of the type described which is produced in a quantity of modular sections which can be releasably coupled with one another to complete the alarm system for a computer or the like.

Other objects of the invention will be apparent hereinafter from the specification and from the recital of the appended claims, particularly when read in conjunction with the accompany drawing.

SUMMARY OF THE INVENTION

The system includes a series of releasably interconnected modular circuits, one of which comprises a rectifier adapted to be connected at one side to the plug which supplies AC power to a computer. The recitifier module has a DC output applied to a motion sensing circuit module, which has an output connected through a tamper sensing modular circuit with an alarm and battery module. A diode in the alarm-battery module maintains the alarm deenergized as long as an AC voltage is applied to the input of the rectifier module, and a mercury switch in the motion sensing module is open.

However, if the AC power supply is removed, and the associated computer is moved, the diode will conduct in the battery circuit and forward bias a transistor which conducts and energizes the alarm until the mercury switch reopens, after which the alarm automatically is deenergized.

The tamper sensing module contains a switch connected in parallel with the mercury switch and normally held open when the cover of the computer is secured properly in place, but which will close and activate the alarm if the cover is removed while the sensing circuit is armed.

THE DRAWING

FIG. 1 is a wiring diagram illustrating an alarm system for computers and the like made according to one embodiment of the invention; and FIG. 2 is a wiring diagram illustrating a modification of the embodiment as shown in FIG. 1.

DETAILED DESCRIPTION OF THE PREFERRED EMBODIMENT

Referring now to the drawing by letters and numerals of reference, and first to FIG. 1, the letters A, B, C, and D denote, respectively, four different modular sections, which are releasably connected to each by conventional piggyback plugs or connectors 12, 13 and 14.

Section A comprises a line L which is connected through a resistor R1 and a neon lamp N1 and one side of plug 12 to the anode terminal of a diode D1, which forms part the modular section B. The cathode of diode D1 is connected by line L2 through one side of the plug 13 with a line L3, which forms part of the section C. Line L3 is connected through the moveable contact of a key switch KS1 and one side of the plug 14 with the cathode terminal of a diode D4 which forms part of the modular section D. The anode of diode D4 is connected by line L4 through a resistor R5 and a line L5 to the positive terminal of the nine volt battery BT, which forms part of the section D. The opposite side of this battery is connected by a line L6 through one side of the plug 14 to a line L7, which forms part of the modular section C. Line L7 is connected through one side of the plug 13 with a line L8, which forms part of section B, and which is connected through one side of plug 12 with a line L9 in section A. Line L9 is connected through a resistor R2 to a line L10, which also forms part of section A.

Section A is designed to supply to Section B a rectified DC power voltage. To this end, a blocking diode D2 has its anode connected to line L9, and its cathode connected in section A to the line connecting the neon lamp N1 to the diode D1. Therefore, when the lines L1 and L10 are connected across an AC power supply, such as a 110 volt supply of the type that is usually employed for supplying power to the computer, or the like, the neon lamp in combination with diode D2 functions to rectify the AC voltage to produce, by way of example, a twelve volt DC drop across diode D2.

Section B contains a capacitor C1, which is connected between lines L2 and L8 in parallel with another capacitor C2, which is connected at one side to line L8, and at its opposite side through a resistor R3 with line L2. A motion sensor switch SS1, which may be in the form of a conventional mercury switch is connected at one side to line L8 and at its opposite side to the junction between capacitor C2 and resistor R3. Also connected in parallel with capacitor C1 between the lines L2 and L8 in section B is a Zener diode D3, the purpose of which is to limit the DC voltage drop which can be developed between lines L2 and L8.

Section C contains a normally closed tamper switch TS1, which is connected between lines L3 and L7 and which in the embodiment illustrated is shown in its open position. The reason for this is that switch TS1 is designed to be mounted in a computer, or the like, in such manner that, when the cover for the computer housing is secured properly in a closed position on the housing, it maintains the switch TS1 in its opened position. In FIG. 1 the key operated switch KS1 is also shown in its opened position simply for purposes of illustration. However, as noted hereinafter, when the alarm system is placed in use, the key switch is moved to its closed position.

Section D contains a transistor T1, the emitter terminal of which is connected to line L5, and the collector terminal of which is connected through a resistor R6 to line L6. The base of the transistor T1 is connected through a resistor R4 to line L4, and in parallel with resistor R5, which is connected in series with lines L4 and L5. Also connected between lines L5 and L6 in section D is an audible warning device, which in the embodiment illustrated is denoted as a siren SR, or piezo electric buzzer such as sold, for example, by Star Micronics under the designation PDB-09. Unit SR has a control terminal connected to the juncture of resistor R6 and the collector terminal of transistor T1.

In use, lines L1 and L10 are connected across the AC power supply which is used for operating the associated computer or other device which is to be guarded. The neon lamp N1, in combination with the blocking diode D2, functions to rectify the AC voltage so that the output of the section A comprises a DC voltage which, when connected to section B, has a positive terminal which is applied to the anode of the diode D1, and a negative terminal which is applied to line L8. This will cause the capacitors C1 and C2 to become charged, after which current flow in Section B ceases.

At this time it will be assumed that the cover for the associated unit is properly installed, so that the switch TS1 is maintained in its opened position as shown in FIG. 1. Also at this time it will also be assumed that the key switch, which operates KS1, has been moved to its operative position in which it holds switch KS1 closed. Under these circumstances the positive terminal of the battery BT is applied to the emitter of the transistor T1, to the anode of the diode D4 and to the base of transistor T1, while the negative terminal of the battery is applied to the collector terminal of T1 to the anode of the Zener diode D3, and to one side each of the capacitors C1 and C2. Under these circumstances the emitter-collector circuit of the transistor T1 is in a non-conducting mode and the charged capacitors C1 and C2 block any current flow through the diodes D1 and D4. Also at this time, of course, the sensor switch SS1 is in its open, upright position so that there is no current flow in the circuit, and the siren device SR is therefore deenergized.

Under the circumstances described above there are two different ways to energize the siren SR. In one manner, all that is required is that the switch TS1 be closed, such as for example as would occur when one attempted, presumably without authorization, to lift the cover from the associated computer or other device while switch KS1 is closed. As soon as the cover is lifted, TS1 automatically closes, thereby applying the negative terminal of battery BT to the cathode terminal of diode D4, and thereby biasing this diode forwardly so that it now conducts, the current flow being limited by resistor R5. As soon as this occurs the base of transistor T1 swings low, thereby biasing the transistor T1 forwardly so that current begins to flow in its emitter-collector circuit, and creating across resistor R6 a voltage drop which causes the siren SR to conduct, or to otherwise be energized by the battery BT, so that it commences to emit an audible warning signal or buzz. The siren SR continues to be energized until such time that the switch TS1 is once again opened, or alternatively, the key switch KS1 is opened.

In addition to the tamper switch TS1, the alarm system or circuit can also be energized if two other conditions exist while the switch KS1 is closed. In this mode of operation the siren SR is controlled by the sensor switch SS1. For example, if the associated computer or other device is picked up and moved, the the switch SS1 will close in response to the movement or acceleration of the associated computer. This tends to discharge or otherwise shunt out the capacitor C2, but at this stage the DC potential is still being applied to section B by section A, so that any current flow which occurs through the resistor R3 will still maintain lines L2 and L3 in a positive mode, thereby maintaining diode D4 in a blocking mode. Consequently, even though switch SS1 closes, the SR will not be energized as long as section A is connected to the AC power supply.

However, as soon as the AC power supply is removed from section A, such as for example when the computer is unplugged from its normal power supply, the DC voltage will disappear from diode D1, and from across lines L2 and L8. When this occurs, assuming the switch SS1 is still closed (i.e., the computer is being moved), the capacitors C1 and C2 will discharge through the switch SS1, thereby biasing diode D4 forwardly, and causing the transistor T1 to conduct and to energize the siren SR. Assuming that shortly thereafter the switch SS1 opens, the siren SR will continue to conduct for the momentary period of time which it takes the battery BT to recharge the capacitors C1 and C2, after which diode D4 will be blocked and will stop conducting, thereby causing the transistor T1 also to cease conducting current in its emitter-collector circuit. The siren SR therefore is then deenergized. Also, of course, whenever the AC power supply is once again applied to line L1 and L10, the DC output of section A will recharge capacitor C1 to maintain diode D4 in a blocking mode regardless of whether or not SS1 is opened or closed.

From the foregoing it will be apparent that the above-described alarm system provides a relatively simple and inexpensive means for preventing unauthorized theft or movement of devices such as computers, video equipment, and the like. A primary advantage of this system is that, in its quiescent state, it requires no power from the battery source BT, since the rectifier circuit in section A functions to maintain the capacitors C1 and C2 charged, and thus in a mode which blocks operation of the siren·SR. When used in connection with an outside power supply, such as the AC power supply for a computer, or the like, the alarm system will function, or provide an audible signal, only when two situations occur—i.e., the AC power supply is removed, and the unit is physically moved or accelerated in such a manner as to cause the sensor switch SS1 to close.

A particular feature of this particular circuitry or usage is that, should the equipment thereafter be replaced in a stationary position, the siren SR will automatically shut off shortly after the switch SS1 reopens—i.e., as soon as the capacitors C1 and C2 recharge. Also, since the alarm system forms an integral part of the computer itself, it will continue to emit an audible signal while it is being carried away or stolen, as the result of its integral power supply as represented by the battery BT. Also, in practice the alarm system is in fact, normally hidden from view, thus making it difficult if not impossible for one to discover that the equipment embodies an alarm system, and thus of course makes it also difficult to disable such a system.

In addition to functioning in combination with an electrically operated device, such as a computer, or the like, the invention also can be adapted for use with equipment which is not normally connected to an electrical power supply. As shown for example in Fig. 2 the sections B and D can be coupled together as by conventional piggy back connector 16 so that under normal circumstances, when the switch SS1 is opened, the power supply from the battery BT will keep the capacitors C1 and C2 charged until such time that the switch SS1 closes, as for example when the device with which the alarm system is employed has been moved from a stationary position. At such time the capacitors C1 and C2 will be discharged through the switch SS1, thereby biasing the diode D4 forwardly and causing the transistor T1 to conduct and to energize the siren SR. The latter remains energized until the switch SS1 reopens.

While this invention has been illustrated and described in connection with only certain embodiments therof, it will be apparent that it is capable of still further modification, and that this application is intended to cover any such modifications as may fall within the scope of one skilled in the art or the appended claims.

We claim:
1. A motion sensitive warning device, comprising
a first modular circuit including a portable, DC power supply,
an electrically operated alarm connected in said first circuit across said power supply,
electronic valve means interposed between said power supply and said alarm and operative to be switched selectively between conducting and nonconducting modes, respectively, said valve means being operative when in one of its modes to maintain said alarm deenergized, and being operative when in the other of its modes to cause said power supply to energize said alarm,
a second modular circuit having therein motion-sensitive switch means, and
means releasably connecting said second circuit at one side to said first circuit with said switch means being operative to maintain said valve means in said one mode when said second circuit is stationary, thereby to maintain said alarm deenergized, and being operative to switch said valve means to its other mode, thereby to energize said alarm when said second circuit is subjected to physical movement, and
said switch means including means connected across said DC power supply and operative to switch said valve means automatically back to said one mode, when after having been subjected to physical movement said second circuit once again becomes stationary.

2. A motion sensitive warning device as defined in claim 1, wherein the last-named means includes time delay means for delaying for a predetermined interval of time the switching of said valve means back to said one mode after said second circuit has once again become stationary.

3. A motion sensitive warning device as defined in claim 2, wherein
said time delay means includes at least one capacitor operatively connected across said power supply, and
a control element is connected in circuit with said capacitor across said power supply normally to be nonconducting when said capacitor is charged, and
said first circuit includes means responsive to current flow through said element to switch said valve means from said one to said other mode.

4. A motion sensitive warning device as defined in claim 3, wherein said motion sensitive switch means comprises a first switch connected in parallel with said capacitor across said power supply normally to block current flow through said element when said second circuit is stationary, and operative to cause current flow through said element when said second circuit is subjected to physical movement.

5. A motion sensitive warning device as defined in claim 4, wherein said control element is a diode connected in series with said first switch across said power supply.

6. A motion sensitive warning device as defined in claim 1, including
a third modular circuit disposed to be releasably connected at one side thereof to an AC power supply,
means releasably connecting the opposite side of said third circuit to said second circuit at the side thereof opposite said first circuit, and
means in said third circuit for rectifying AC voltage from said AC power supply to produce a DC voltage across said opposite side of said third circuit, and operative independently of said motion sensitive switch means to maintain said valve means in said first mode as long as said one side of said third circuit is connected to said AC power supply.

7. A motion sensitive warning device as defined in claim 6, including
a fourth modular circuit,
means releasably connecting said fourth circuit at one side to said second circuit, and at its opposite side to one of said first and third circuits, respectively, and a further switch in said fourth circuit operatively connected in parallel with said motion sensitive switch means, and movable between open and closed positions, respectively, by forces external to said circuits, said further switch being operative, when closed, to switch said valve means to said other mode regardless of whether or not said one side of said third circuit is connected to said AC power supply.

8. A motion sensitive warning device as defined in claim 1, including
   means for applying a second DC power supply to said second circuit in parallel with the first-named power supply, and
   means interposed between said motion responsive switch means and said valve means and operative independently of said switch means to prevent said valve means from being switched to said other mode as long as said second DC power supply is applied to said second circuit.

9. A motion sensitive warning device as defined in claim 8, wherein said means interposed between said switch means and said valve means comprises a diode disposed when not conducting to maintain said valve means in said first mode, and operative when conducting to switch said valve means to said other mode, and
   said second DC power supply is operative to maintain said diode in its nonconducting mode even when said second circuit is subjected to physical movement.

10. A motion sensitive alarm device for electrically operated equipment such as computers and the like, comprising
    a plurality of modular circuits,
    means for releasably connecting one side of a first one of said circuits to an AC power supply through the same plug that is used to supply power to a piece of electrically operated equipment,
    means in said first circuit for rectifying an AC voltage received from said power supply, and for producing a first DC power supply at an output of said first circuit,
    means for releasably connecting the output of said first circuit to one side of a second one of said modular circuits,
    means for connecting the opposite side of said second circuit with a third one of said circuits,
    said third circuit having therein a portable DC power supply the output of which is applied to said second circuit at the side thereof opposite said one side thereof,
    an electrical alarm in said third circuit,
    electronic valve means in said third circuit between said alarm and said DC power supplies and operative, when nonconducting, to maintain said alarm deenergized, and operative when conducting to energize said alarm,
    a normally-open motion sensitive switch in said second circuit operative when open, to maintain said valve means in its nonconducting mode, and
    means for switching said valve means to a conducting mode when said switch is closed and said one side of said first circuit is not connected to an AC power supply.

11. A motion sensitive alarm device as defined in claim 10, including a capacitor connected in parallel with said switch to be charged by both of said DC power supplies.

12. A motion sensitive alarm device as defined in claim 10, wherein
    said alarm is connected across said portable DC power supply and has thereon a trigger terminal operative, when energized, to actuate said alarm, and
    said valve means has the output thereof connected to said terminal to energize the latter when said valve means is switched to its conducting mode.

13. A motion sensitive alarm device as defined in claim 12, wherein said means for switching said valve means comprises a diode connected in series with said switch and in opposition to the DC voltage produced at the output of said first circuit, and operative to conduct and switch said valve means to its conducting mode only when said switch is closed and said first circuit is not connected to said AC power supply.

14. A motion sensitive alarm device as defined in claim 11, including a resistor connected in series with said switch and in parallel with said capacitor and operative to delay the return of said valve means to its nonconducting mode when said motion sensitive switch moves from a closed to its open position.

* * * * *